Z. STREET.
FEED-TROUGHS FOR STOCK-CARS.
No. 181,495. Patented Aug. 22, 1876.
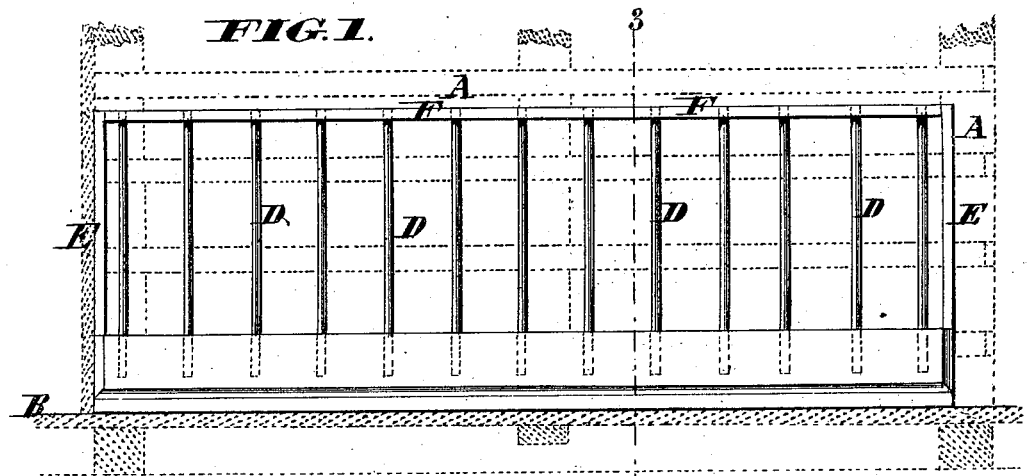
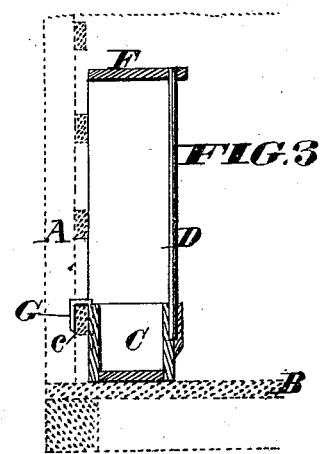
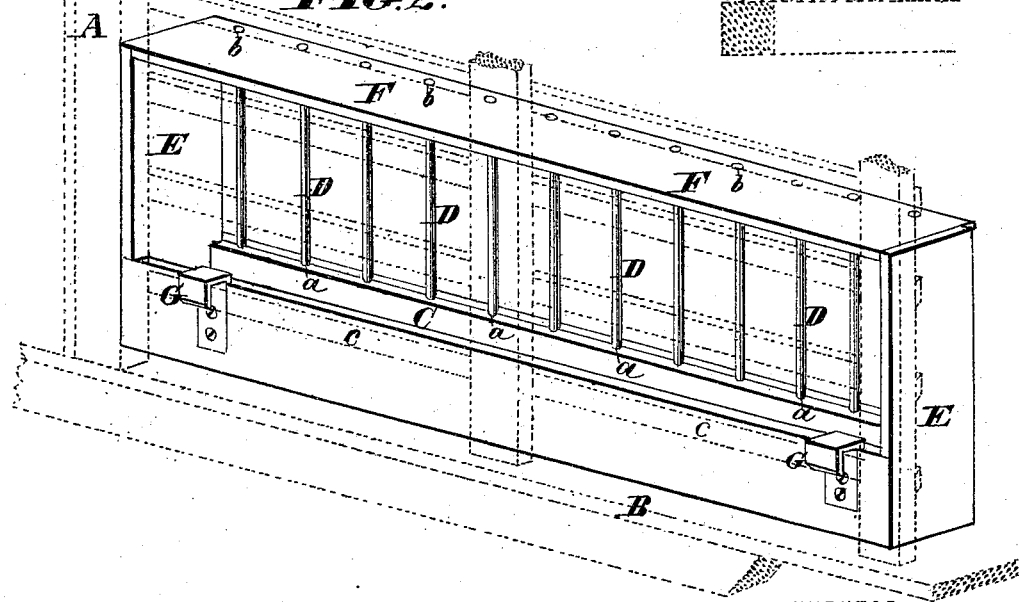
WITNESSES
Chas J. Gooch
LeBlond Burdett
INVENTOR
Zadok Street
By Knight Bros Attorneys.

UNITED STATES PATENT OFFICE.

ZADOK STREET, OF SALEM, OHIO.

IMPROVEMENT IN FEED-TROUGHS FOR STOCK-CARS.

Specification forming part of Letters Patent No. 181,495, dated August 22, 1876; application filed September 13, 1875.

*To all whom it may concern:*

Be it known that I, ZADOK STREET, of Salem, in the county of Columbiana and State of Ohio, have invented certain new and useful Improvements in Stock-Cars, of which the following is a specification:

This invention relates to improvements in feeding-troughs for use in stock-cars, by means of which the animals may be conveyed long distances without injury or suffering.

To the front side of the trough the lower ends of vertical rods or bars are secured. The upper ends of these rods are secured to another plank, placed at a suitable distance above the trough, and secured at its ends to uprights placed at each end of the trough. By this means provision is made for the animals feeding without crowding each other, and also prevents the food being overturned or distributed over the floor of the car by animals getting inside the trough. The arrangement, moreover, tends to keep the animals cleaner and more healthy than when troughs of an open character are used.

In the accompanying drawings, Figure 1 is a front view of my improved trough, showing the same placed in position against the side of a car, the dotted lines indicating the timbers of the car. Fig. 2 represents a perspective rear view of the same. Fig. 3 represents a vertical section on the line 3 3 of Fig. 1.

A represents the frame-work of a car or other conveyance used for transporting hogs, cattle, or other stock from place to place. B is the floor thereof. C represents the trough proper, within which the food or water is placed. D D represent the rods or bars, placed at convenient distances apart at the front of the trough, to form divisions for enabling the animals to feed without crowding one another, and also to prevent their entrance into the trough and scattering its contents over the car. The arrangement of the bars also tends to keeping the animals clean and healthy by preventing the contact of their feet or bodies with the contents of the trough, while at the same time they have free and ample access thereto for the purpose of feeding. The lower ends of the rods D D are secured to the front of the trough. At each end of the trough are uprights E, which serve to support a top plank, F, to which the upper ends of the rods D are secured. G G represent hooks or hangers for supporting or hanging the trough upon a beam or rail, c, on the side of the conveyance. These hooks G may be made of flat metal, or of any other desired shape, and may be secured at their lower ends to the rear side of the trough by bolts, screws, rivets, or any other suitable means.

This construction of the trough has been found in practice to be greatly superior to those now in use, as, while it enables the animals to secure an abundance of food, it prevents the crowding and accumulation of filth on the animals consequent on the use of open troughs. It can also readily be removed for the purposes of cleansing, or where the car is required to be used for carrying merchandise, there being no fixtures required in the car that will in any way incommode its use when desired for transporting other classes of freight.

I am aware that Letters Patent No. 106,887, granted to me August 30, 1870, show an arrangement of vertical bars and stanchions for use in stock-cars; but in that arrangement the stanchions are rendered adjustable to secure the holding of the animals in position by clasping their necks, and the vertical bars are arranged so as to hold and separate the animals at their rear, and thus prevent crowding or sidewise movement during transit.

I claim as new and desire to secure by Letters Patent—

A removable feed-trough for stock-cars, having at its front vertical bars D, the lower ends of which are secured to the trough C, while their upper ends are secured to the top F of the frame, and held firmly and immovably in position to prevent the entrance of animals therein, said frame being open at its rear to permit of its being placed in position against the car, and to facilitate the supplying of the trough with feed and water, substantially as set forth.

ZADOK STREET.

Witnesses:
WILLIS W. POWERS,
THOS. SPENCER.